(12) United States Patent
Harmann et al.

(10) Patent No.: US 9,769,915 B2
(45) Date of Patent: Sep. 19, 2017

(54) DRIVE ARRANGEMENT IN A SPACECRAFT

(75) Inventors: Hans-Peter Harmann, Lindau (DE); Norbert Koch, Ulm (DE); Guenter Kornfeld, Elchingen (DE)

(73) Assignee: Thales Electronic Systems GmbH, Ulm (DE)

( * ) Notice: Subject to any disclaimer, the term of this patent is extended or adjusted under 35 U.S.C. 154(b) by 1683 days.

(21) Appl. No.: 12/733,629

(22) PCT Filed: Sep. 12, 2008

(86) PCT No.: PCT/EP2008/062144
§ 371 (c)(1),
(2), (4) Date: Nov. 29, 2010

(87) PCT Pub. No.: WO2009/037196
PCT Pub. Date: Mar. 26, 2009

(65) Prior Publication Data
US 2011/0073713 A1    Mar. 31, 2011

(30) Foreign Application Priority Data
Sep. 14, 2007  (DE) .................. 10 2007 044 071

(51) Int. Cl.
*B64G 1/40* (2006.01)
*H05H 1/54* (2006.01)
*F03H 1/00* (2006.01)

(52) U.S. Cl.
CPC .............. *H05H 1/54* (2013.01); *B64G 1/405* (2013.01); *F03H 1/0062* (2013.01)

(58) Field of Classification Search
USPC ................... 244/158.1, 171.1, 171.2
See application file for complete search history.

(56) References Cited

U.S. PATENT DOCUMENTS

| 4,848,706 A * | 7/1989 | Garg et al. ............... 244/169 |
| 5,339,623 A * | 8/1994 | Smith .................... 60/203.1 |
| 5,947,421 A * | 9/1999 | Beattie et al. ........... 244/171.1 |
| 6,066,897 A * | 5/2000 | Nakamura .............. 290/4 A |
| 6,173,565 B1 | 1/2001 | Cassady et al. |
| 6,518,693 B1 | 2/2003 | Meyer et al. |

(Continued)

FOREIGN PATENT DOCUMENTS

| EP | 0 550 250 | 7/1993 |
| EP | 0 890 739 | 1/1999 |

(Continued)

OTHER PUBLICATIONS

International Search Report.

*Primary Examiner* — Marc R Burgess
(74) *Attorney, Agent, or Firm* — Collard & Roe, P.C.

(57) ABSTRACT

The invention relates to a drive arrangement in a spacecraft, comprising several drive units (TW1,TW2,TW3), several individually controllable drive units that can be continuously applied to a common, constant voltage potential (HV), and a control of the axial thrust in the respective drive units is achieved due to the fact that the production of plasma in the respective drive units is individually controlled. In particular, the time-variable control of the production of plasma occurs by the time-variable control of the flow of neutral working gas (AG) in the ionization chamber (IK).

15 Claims, 2 Drawing Sheets

(56) References Cited

U.S. PATENT DOCUMENTS

Figure 1:
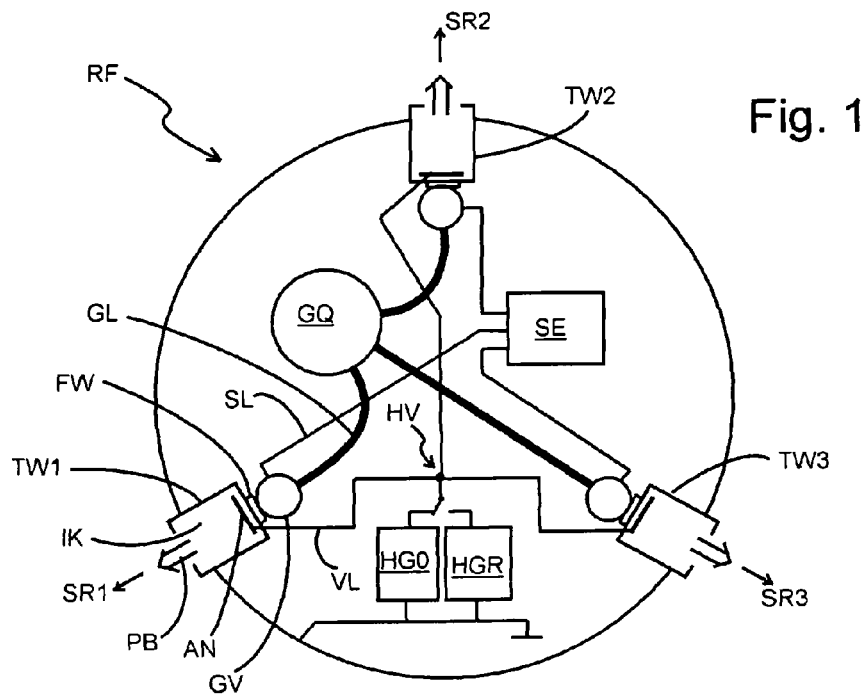

| | | | |
|---|---|---|---|
| 7,084,572 B2 | 8/2006 | Kornfeld et al. | |
| 2005/0005593 A1 | 1/2005 | Beattie et al. | |
| 2005/0092596 A1* | 5/2005 | Kouznetsov | 204/192.12 |
| 2005/0188701 A1* | 9/2005 | Kung et al. | 60/772 |

FOREIGN PATENT DOCUMENTS

| | | |
|---|---|---|
| GB | 2 262 777 | 6/1993 |
| WO | WO 03/000550 | 1/2003 |

* cited by examiner

DRIVE ARRANGEMENT IN A SPACECRAFT

CROSS REFERENCE TO RELATED APPLICATIONS

This application is the National Stage of PCT/EP2008/062144 filed on Sep. 12, 2008, which claims priority under 35 U.S.C. §119 of German Application No. 10 2007 044 071.7 filed on Sep. 14, 2007. The international application under PCT article 21(2) was not published in English.

The invention relates to a drive arrangement in a spacecraft.

For drive arrangements in spacecraft, such as, in particular, satellites or space probes, not only chemical drives but also electrical drives are known. The latter particularly utilize a high voltage, in order to accelerate positively charged ions of a working gas ionized in an ionization chamber and to eject them through an opening of the ionization chamber as a plasma beam. In this connection, the spacecraft is accelerated in the opposite direction according to the recoil principle. Preferably, a noble gas such as, in particular, xenon serves as the working gas.

In order to bring a spacecraft into different flight positions and to be able to exert acceleration forces in different directions, multiple drive units are provided, particularly having different and/or adjustable orientations. Since a failed drive unit in a spacecraft typically cannot be repaired or replaced, additional drive units are generally disposed in the spacecraft.

The generation of drive power of such electrical drives takes place by means of feed of neutral working gas into the ionization chamber, ionization of the working gas, and electrostatic acceleration of positively charged gas ions, which are ejected from a beam exit opening as an accelerated plasma beam. A variation in the drive power can take place by means of variation of the high voltage, in the simplest case by turning the high voltage on and off. In order to be able to control the individual drive units independently of one another, in this connection the high-voltage potential of a high-voltage supply device assigned to this drive unit must be controlled by a control unit. In this connection, such a high-voltage supply device typically comprises multiple high-voltage generators. Since these are expensive and increase the weight of the spacecraft, it should be aimed at to keep the number of high-voltage generators as low as possible, whereby, however, precautionary measures also have to be taken for failure of a high-voltage generator, in the case of the high-voltage generators, and for this reason one or typically multiple reserve high-voltage generators are provided in the spacecraft.

A drive system for spacecraft is known from EP 0 550 250 B1, in which multiple electrostatic grid engines are fed from a common energy supply. In this connection, separate high-voltage generators for different required high voltages are assigned to each engine. The high-voltage generators are simultaneously supplied with energy, and the high voltages are applied to all the engines at the same time. An individual engine can be supplied with working gas by means of opening a related gas valve, and can be selectively activated in this manner. Cathode heaters of primary electron sources can be selectively turned on and off by way of switches. A comparable system is known from EP 0 890 739 B1.

In order to not have to make a separate high-voltage generator and a replacement generator available for every drive unit, particularly in the case of a larger number of drive units to be controlled independently of one another, a first number of high-voltage generators and a second number of drive units can be connected by way of a switching matrix having electrical switches. A drive unit required for a maneuver of the spacecraft is connected with a high-voltage generator that is currently not needed for a different drive unit, by way of the switching matrix. However, switching over a matrix connection is only permissible when the high voltage is turned off, because of stress on the electronic matrix switching elements. Such matrix switching elements frequently fail, and this leads to functional restrictions in the control of the spacecraft. The complexity of the arrangement is further increased by redundantly provided and disposed switching elements.

The present invention is based on the task of indicating a drive arrangement in a spacecraft that is further simplified and less problem-prone.

The shift in the changeable control of a drive unit, from influencing the high voltage to influencing the generation of plasma, and the simultaneous supply to multiple drive units from a common high-voltage potential of a high-voltage supply device, yield significant advantages in the changeable control and the structure of the entire arrangement. In particular, in many applications, the number of high-voltage generators in the high-voltage supply device can be clearly reduced, and thus costs and weight can be saved. In particular, all or at least all the active drive units of the drive arrangement can also be supplied by a common high-voltage potential. In contrast to the state of the art according to EP 0 550 250 B1, only one high-voltage generator is needed for multiple drive units, and the output of the one high-voltage generator forms the common high-voltage potential that is branched to the high-voltage electrodes of the multiple drive units. The high-voltage generator can contain multiple generator stages in a parallel arrangement, which stages, however, generate a common high-voltage potential at the output of the common high-voltage generator for all the drive units, in each instance.

The changeable control by means of influencing the generation of plasma particularly comprises the rate at which plasma is newly generated. For this purpose, in the case of high-frequency engines as drive units, the ionization rate can be influenced in changeable manner by switching or changing the high-frequency field in the ionization chamber that brings about ionization. In a particularly advantageous embodiment, the changeable control of the drive power of a drive unit takes place by means of changeable control of the gas flow into the ionization chamber of the drive unit, whereby gas flow is understood to mean the amount of gas that is introduced into the ionization chamber per time unit. A higher gas flow leads to a higher rate of generation of ions or plasma. In this connection, the values of the high voltage can advantageously be constant.

The changeable control of the gas flow advantageously takes place by means of the controllable gas valves individually switched ahead of the drive units, in each instance. In a first advantageous embodiment, the gas valves, as metering valves, can continuously change the gas flow at least over one gas flow region, under the effect of the control device. In another advantageous embodiment, the gas valves can be structured as switching valves, which are particularly advantageous due to their simple and problem-resistant structure, and can be switched only between a closed and an open state. Such switching leads to operating states of the drive unit between an idle state without working gas in the ionization chamber and a drive state with a uniform maximal drive power. This is particularly advantageous if the drive unit possesses a specific working point, which is particularly advantageous, for example, with regard to the ratio of drive thrust power to gas flow.

An averaged drive power, which lies between the idle state and the maximal drive power, can be set by means of cycled operation. In this connection, a constantly applied high voltage during cycling of the gas flow is particularly advantageous, since switching of the high voltages is avoided.

To set a value of the gas flow between a maximal gas flow and closed gas feed, in an advantageous embodiment, the control device can be set a cycled operation of a gas flow switching valve and a gas flow resistor can be disposed in the feed system between gas valve and ionization chamber, which resistor smoothes the gas flow in front of the ionization chamber, which occurs in surges, in accordance with the cycled operation of the valve, and converts it to a gas stream having a lower modulation stroke around a between the unsmoothed, unswitched states. Such a flow resistor can be a nozzle or a detour line, for example. In a preferred embodiment, the flow resistor is formed by a gas-permeable, open-pored body, particularly from a ceramic material. An intermediate value between idle and maximal gas flow can also by means of the use of two or more switching valves in the gas feed system to a drive unit, which are disposed parallel in the gas stream and can be switched individually, and can be stepped differently, for example in binary manner, in the partial gas flows brought about by them. The gas valves are advantageously disposed in the immediate vicinity of the drive units. Advantageously, the individual drive unit is at high ohms in its idle state, i.e. without gas feed, in its high-voltage circuit between a cathode electrode, by way of the ionization chamber, to an anode electrode, particularly at a resistance of more than 100 kOhm.

It is particularly advantageous that a drive unit not needed for a maneuver also has the same high voltage applied to it as activated drive units, and that activation of a drive unit, to turn on the drive power, can take place solely by introducing working gas into the ionization chamber, without any change in the electrical system, and turning on a neutralizer, if necessary. Ionization and plasma generation in the ionization chamber, through which the electrostatic field of the electrode arrangement to which high voltage is applied passes even in idle, begins with the presence of working gas in the ionization chamber. Shut-off of a drive unit can take place simply by means of shutting off the gas feed stream, without shutting off the high voltage. The high voltage continues to be applied at the shut-off drive unit, so that no shutoff or re-switching in the high-voltage current circuit is necessary, and the high-voltage current circuit can be structured to be free of switching elements, particularly free of the switching elements assigned to the individual drive units. During extended shut-down times of all drive units supplied from the same high-voltage potential, the high-voltage generator can also be shut off.

A structure of an ion accelerator that is known from WO03/000550 A1, in which a magnet arrangement generates a magnetic field in an ionization chamber, which field has at least two cusp structures spaced apart in the longitudinal direction, is particularly advantageous. The magnet arrangement comprises multiple oppositely poled magnet rings that follow one another and alternate in the longitudinal direction. A cathode electrode is disposed in the region of the beam exit opening of the ionization chamber, preferably outside the chamber, offset laterally relative to the beam exit opening, and an anode electrode is disposed at the foot of the chamber, set opposite the beam exit opening in the longitudinal direction. Electrons emitted by the cathode and accelerated in the direction of the anode by means of the electrostatic field between cathode and anode dwell in the cusp structures for a long time, so that the current that flows between cathode and anode in idle operation and thus also the idle power consumption of the drive unit are low, particularly also significantly lower than in the case of Hall ion engines.

An ion accelerator having this construction furthermore has the advantage, as compared with the grid engines known from the documents EP 0 550 250 B1 and EP 0 890 739 B1 named initially, that voltage flashovers, which are known as flame-out between adjacent grids, in the case of the grid engines, and occur frequently, do not take place, so that changes in the high-voltage potential that result from operation of one or more drive units remain low. Ion accelerators of this construction furthermore have the particular advantage that only one high voltage, namely between cathode and anode, is required, and that this high voltage can be kept the same for different flow rates of the working gas, whereas grid engines typically require tuning between gas flow rate and high voltage.

Furthermore, multiple drive units, particularly multiple drive units supplied from a common high-voltage potential of the high-voltage supply device at the same time, are advantageously disposed on the spacecraft in different orientations. Since advantageously, at the same time, multiple drive units also can produce drive power at different thrust vectors and at an individually controllable drive power, for example according to one of the types described, the control device can set a resulting thrust vector extensively in any desired manner, in the intermediate directions between the orientations of the individual drive units, by means of the changeable control of the drive power of the individual drive units. In this connection, only the gas valves to which comparatively small voltages and current are applied need to be controlled, while the high voltage is constantly and continuously connected with the drive units.

In order to obtain maneuverability of the spacecraft in the event of disruptions of the drive system that consists of a high-voltage generator and multiple drive units, components can be redundantly provided. In a first embodiment, the high-voltage generator can contain at least two generator stages that lie in parallel electrically, which are switched to a common high-voltage output of the high-voltage generator, whereby such switching to the common high-voltage output advantageously takes place in switch-free manner, by way of feedback barriers, particularly diodes. The parallel generator stages can advantageously be activated either individually or both at the same time, depending on the load. In an advantageous further development, a second high-voltage generator can be provided, which is connected with the network of the high-voltage feed lines in place of the first high-voltage generator, in the event of a disruption of the first high-voltage generator, by means of central switching means that are advantageously switched ahead of the network of distributor lines that are permanently connected electrically with one another. Such one-time re-switching advantageously takes place when the high-voltage generators are shut off. In another advantageous embodiment, a second drive system having a second high-voltage generator and having multiple drive units supplied with high voltage only from this generator is provided, as redundancy for the event of disruption or as support for a drive system having a first high-voltage generator and multiple drive units supplied from it. In this way, switching elements in high-voltage current circuits, which are susceptible to problems, can advantageously be completely avoided.

For operation of the neutralizers that serve as an electron source for ionization, but particularly for neutralization of the ion beam, different switching systems and arrangements are known from the cited state of the art, which can be combined, extensively in any desired manner, with the present invention relating to the high-voltage part.

Figure 2:
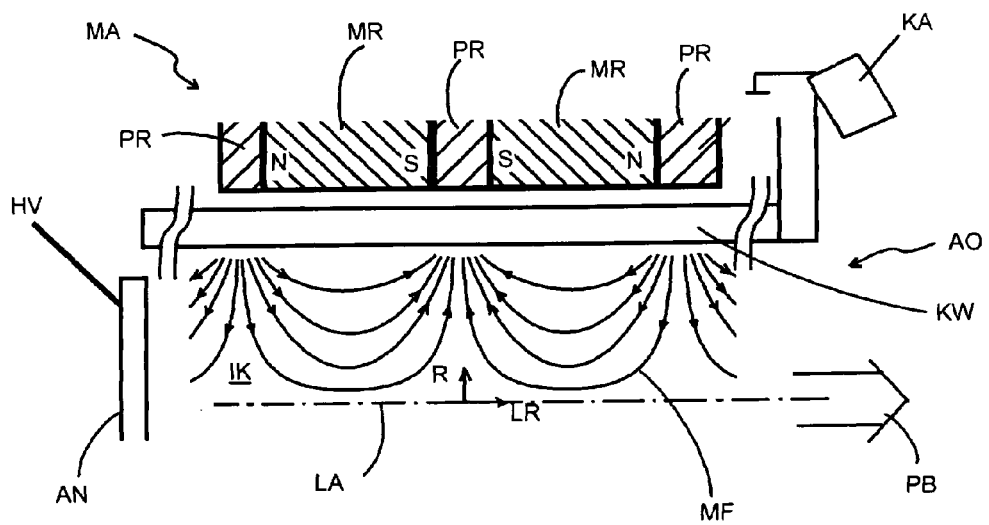
Figure 3:
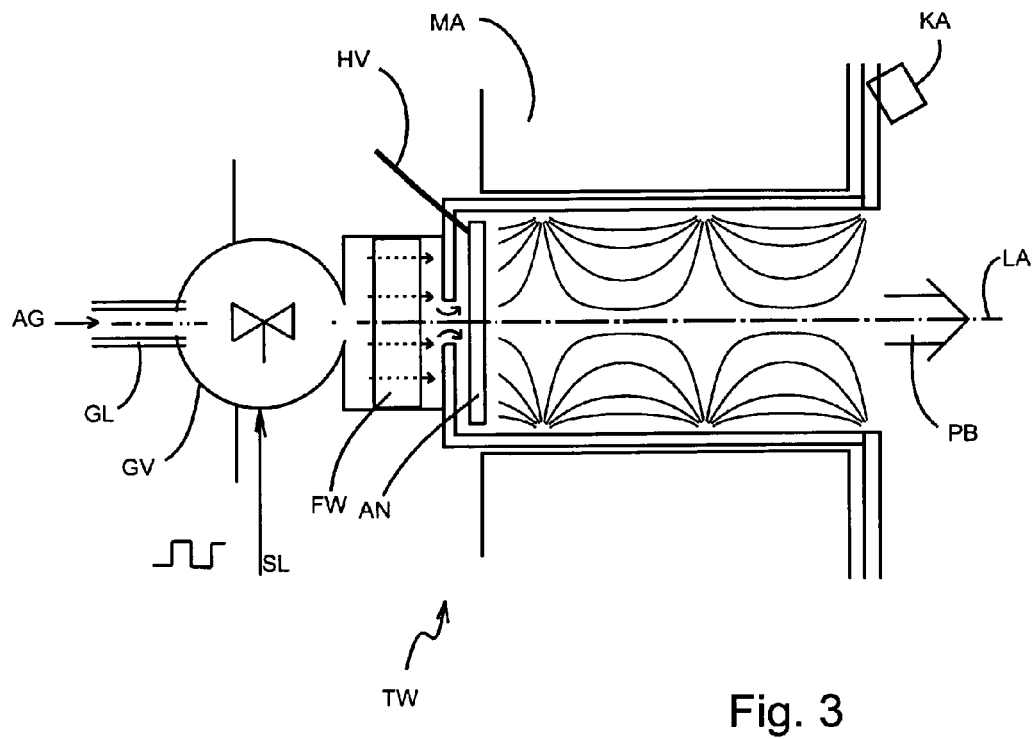
Figure 4:
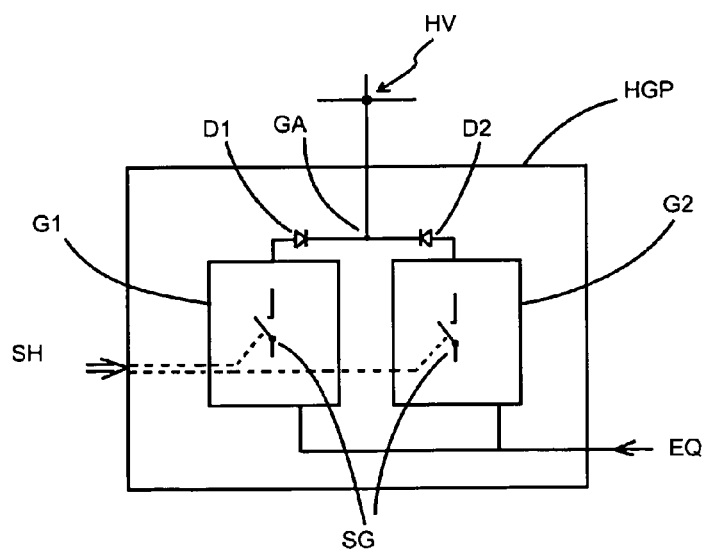

The invention will be illustrated in greater detail in the following, using preferred exemplary embodiments and making reference to the figures. In this connection, the drawings show:

FIG. 1 a schematic arrangement of multiple drive units, in a spacecraft,

FIG. 2 a preferred structure of a drive unit,

FIG. 3 a drive unit having a switching valve,

FIG. 4 a high-voltage generator having parallel generator stages.

In FIG. 1, a compilation of the components of a spacecraft RF that is indicated, which components are significant for the explanation of the invention and its further developments, is shown schematically. Let multiple drive units TW1, TW2, TW3 be disposed on the spacecraft, which are structured as ion accelerator arrangements and can each emit a plasma beam PB to generate a drive thrust. Let the individual drive devices TW1, TW2, TW3 be oriented differently, with beam directions SR1, SR2, and SR3. The beam directions of the individual drive arrangements can also be changeable by means of pivoting mounting of the drive units. Each drive unit comprises an ionization chamber IK, in which a working gas that is fed in is ionized and electrostatically accelerated and ejected through a beam exit opening as a plasma beam PB. An anode arrangement AN is disposed at the foot of the ionization chamber, in each instance, set opposite the beam exit opening in the beam direction, in each instance.

A high-voltage supply device contains a first high-voltage generator HG0 and a reserve high-voltage generator HGR, which are configured to generate a high voltage HV relative to the mass potential M of the spacecraft. A switch between the two high-voltage generators can be made by way of a switching device. In the sketch, the high-voltage generator HG0, as the active generator, which supplies the high voltage HV, is connected to a system of high-voltage supply lines VL, by way of which lines the anode arrangements AN of the individual ion accelerator arrangements are constantly connected with the high-voltage generator, and lie at high voltage relative to the mass potential.

In another advantageous embodiment, not shown, the high-voltage generator HG0 can be permanently connected with the drive units TW1, TW2, TW3 by way of the high-voltage lines VL, and a second drive system having another high-voltage generator and permanently connected with it by way of its own connection lines, without switching elements, can be provided. The high-voltage current circuits of the two drive systems are independent of one another even at a common mass potential. The gas supply of both drive systems can take place from a common gas supply container. The two drive systems can be operated alternatively or also jointly. In particular, the two drive systems can also advantageously supplement one another in the event of failure of individual drive units.

Gas feed lines GL lead from a gas supply container GQ to gas valves GV, which are individually assigned to individual ion accelerator arrangements TW1, TW2, TW3. The individual gas valves GV can be individually controlled by a control device SE, by way of control lines SL.

For the sake of clarity, the individual components mentioned are indicated in detail only with regard to the ion accelerator arrangement TW1. The designations can be transferred analogously to the components assigned to the other ion accelerator arrangements TW2, TW3.

By means of the high voltage that is applied simultaneously at all the anode arrangements AN, and the individual controllability of the gas flow, by means of the individual gas valves GV, into the ionization chamber of the individual ion accelerator arrangements, the ion accelerator arrangements can yield a drive thrust opposite their beam direction, in each instance, both individually and several at a time. The number of drive units and their orientation should be understood merely symbolically in the example shown, in order to illustrate that multiple drive units in different orientations can be provided. In a real case, of course, it should be noted that the spacecraft must be laterally controllable in three dimensions, and furthermore must be changeable in its orientation by means of rotational movements. In order to generate a thrust force opposite the beam direction of a drive unit, it is sufficient to generate thrust in this drive unit. For a drive thrust in a force direction that is not directed precisely opposite the beam direction of a drive unit, multiple drive units can be operated at the same time, or, for example in the case of cycling, almost at the same time, and yield their own drive thrust, in each instance, whereby the drive thrusts of the drive units involved can also be different, so that the resulting thrust vector can be set for any desired directions, to a great extent. Setting of the direction and the intensity of such a resulting drive thrust takes place by means of the control device, with the activation signals for the gas valves that are correspondingly adapted to the required drive thrust, in each instance, and cycled, if necessary.

The gas valves are advantageously disposed in the immediate vicinity of the drive units. A gas flow resistance device FW can furthermore be inserted between gas valve and ionization chamber of a drive unit, and reduces the modulation of the gas flow in cycled operation of a gas valve, which occurs as the result of cycling, and makes the gas flow uniform. The flow resistor of such a device FW is advantageously larger, particularly twice as large as the cumulative flow resistance of the other modules in the gas stream, from the beginning of the gas valve all the way into the ionization chamber.

FIG. 2 shows a preferred, known structure of a drive unit as an ion accelerator arrangement, as it is described in its fundamental method of functioning also in WO03/000550A1. In this connection, FIG. 2 shows a sectional diagram through the ion accelerator arrangement with a section plane that passes through a center longitudinal axis LA of the ionization chamber IK. Let the ion acceleration chamber be assumed to be essentially rotation-symmetrical, and therefore in FIG. 2, only one half of the ion accelerator arrangement, which lies on one side of the center longitudinal axis LA, is shown.

The ion accelerator arrangement shown possesses an ionization chamber IK laterally delimited by a chamber wall KW, about the center longitudinal axis LA. The ionization chamber is open toward one side, in a longitudinal direction LR. By means of the beam exit opening AO given there, an accelerated plasma beam PB is ejected in the longitudinal direction LR during operation of the ion accelerator arrangement, i.e. when working gas is fed into the ionization chamber. Outside the ionization chamber and offset laterally relative to the beam exit opening AO, a cathode KA is disposed. An anode arrangement AN is disposed at the foot of the ionization chamber, opposite the beam exit opening AO in the longitudinal direction LR. A high voltage HV lies between the cathode KA and the anode arrangement AN, whereby typically, the cathode lies at the mass potential M of the spacecraft.

In the radial direction R, on the side of the chamber wall that faces away from the ionization chamber IK, a magnet arrangement MA that surrounds the ionization chamber is provided, which is multi-stage particularly in the longitudinal direction LR, and contains at least two magnet rings MR that are spaced apart from one another in the longitudinal direction, whose magnetic poles S, N are set opposite one another in the longitudinal direction, whereby the orientation of magnet rings that are adjacent to one another in the longitudinal direction is set to be opposite, so that poles having the same direction, in the drawing two south poles S of adjacent magnet rings, lie opposite one another. Advantageously, soft-magnetic pole shoes PR are disposed between the magnet rings MR and/or laterally next to them in the longitudinal direction. The structure of such a magnet arrangement is known from the state of the art that was mentioned. The magnet arrangement generates a magnetic field MF in the plasma chamber, which possesses at least two cusp structures, spaced apart in the longitudinal direction. In these cusp structures, the magnetic field lines run in curved shape, starting from the longitudinal axis LA, in the direction toward the chamber wall or through it, toward the pole shoes PR, whereby a high field gradient occurs. Such ion accelerator arrangements have already been described multiple times in the literature, under the designation HEMP. An ion accelerator arrangement is particularly advantageous also because it is at very high ohms in its high-voltage circuit in an idle state, when voltage is applied, but without gas inflow into the ionization chamber, particularly with a resistance of more than 1 MOhm, so that the current between cathode and anode remains below 1 mA at a typical high-voltage value of 1 kV.

FIG. 3 shows a drive unit, particularly of the type shown in greater detail in FIG. 2, having a gas valve GV, which can particularly be configured as a switchable valve. Working gas AG is passed to the gas valve GV by way of a gas feed line GL, from the gas source GQ. In particular, a heavy noble gas such as xenon can be used as the working gas.

The gas valve is controlled by the control device SE, by way of a control line SL, and opens and closes in accordance with the control signal on the control line. The control signal can also be, in particular, a cycled switching signal.

At the output of the gas valve GV, a gas stream modulated in accordance with the control signal on the control line SL occurs. A flow resistance body as a flow resistance device FW having a greater flow resistance relative to the open gas valve and the remaining flow path up to the ionization chamber can smooth the modulation of the modulated gas flow. The flow resistance body FW can be formed, for example, by means of an open-pored body, particularly an open-pored ceramic body.

The working gas that leaves the flow resistance body in the flow direction flows through an aperture on a back of the anode arrangement AN that faces away from the ionization chamber IK, in the arrangement shown, and laterally past it into the ionization chamber.

As soon as working gas enters into the ionization chamber, the ionization process and the formation of a plasma start there, and the drive unit TW generates a drive thrust by ejecting a plasma beam PB.

FIG. 4 schematically shows a high-voltage generator HGP in which two generator stages GS1, GS2 are provided, in an electrical parallel circuit. The two generator stages are supplied with electrical energy from a common energy source EQ, which is not shown in the drawing. The high-voltage powers generated by the two generator stages are passed to a common output GA by way of diode arrangements D1, D2 as feedback barriers, and there generate a high-voltage potential HV that is common to multiple drive devices. The two generator stages can be individually or jointly activated by way of control signals SH, which are generated, for example, by the control device SE that also controls the gas valves, as indicated by switch symbols SG in the generator stages. In this way, it can advantageously be taken into consideration that at a higher thrust power, particularly in the case of simultaneous operation of multiple drive units, parallel operation of the two generator stages can be more efficient, and at a lower thrust power, operation of only one generator stage can be more efficient.

The characteristics indicated above and in the claims, as well as those that can be derived from the figures, can advantageously be implemented both individually and in various combinations. The invention is not restricted to the exemplary embodiments described, but rather can be modified in many different ways, within the scope of the actions of a person skilled in the art.

The invention claimed is:

1. Drive arrangement in a spacecraft, having multiple drive units, which can be changeably controlled, in terms of their drive power, by a control device, individually and independently of one another, whereby the individual drive units have an ionization chamber, a gas feed line, and an electrode arrangement, in each instance, and having a high-voltage supply device from which the individual drive units can be supplied with high voltage, whereby the high voltage forms an electrostatic acceleration field for a plasma in the individual drive units, which is present in a working gas fed to the ionization chamber and ionized there, wherein multiple drive units that are controllable independently of one another are simultaneously supplied with high voltage from a common high-voltage potential of the high-voltage supply device, and wherein the control device changeably controls the generation of plasma in the ionization chambers, to changeably control the drive power of the individual drive units, and wherein in order to generate a drive thrust in a thrust direction that does not coincide with the orientation of a drive unit, the control turns on multiple drive units at the same time, to generate drive power.

2. Arrangement according to claim 1, wherein the control device for changeable control of the drive power of a drive unit changeably controls the inflow of neutral working gas into the ionization chamber of the drive unit, in each instance.

3. Arrangement according to claim 2, wherein, independently of the changeable control of the inflow of working gas into the ionization chamber of one or more drive units, the high voltage is constantly applied at the electrode arrangement of all the multiple drive units.

4. Arrangement according to claim 2, further comprising controllable gas valves in gas lines to the individual drive units.

5. Arrangement according to claim 4, wherein the gas stream can be controlled continuously or by way of intermediate steps between closed valve and maximally open valve.

6. Arrangement according to claim 4, wherein at least part of the multiple gas valves are configured as switching valves.

7. Arrangement according to claim 4, wherein the controllable gas valve assigned to a drive unit is disposed at the drive unit.

8. Arrangement according to claim 1, wherein flow resistance arrangements are provided in the gas feed lines.

9. Arrangement according to claim 1, wherein the drive units, in the absence of plasma in the ionization chamber, are at high ohms in their high-voltage current circuit, in each instance, particularly possess a resistance of at least 100 kOhm.

10. Arrangement according to claim 1, wherein a drive unit possesses a cathode disposed in the region of an exit opening of the ionization chamber and an anode disposed at the foot of the ionization chamber, opposite the exit opening, and the high voltage brings about an electrostatic field that passes through the ionization chamber.

11. Arrangement according to claim 10, wherein the ionization chamber is laterally surrounded by a magnet arrangement and wherein the magnet arrangement generates a magnetic field in the ionization chamber, which has at least two cusp structures spaced apart in the longitudinal direction.

12. Arrangement according to claim 1, wherein multiple drive units supplied from a common high-voltage potential are disposed on the spacecraft in different orientations.

13. Arrangement according to claim 1, wherein different drive units are disposed on the spacecraft in fixed, different orientations.

14. Arrangement according to claim 1, wherein the high-voltage generator contains multiple generator stages disposed electrically in parallel, which are guided to a common high-voltage output.

15. Arrangement according to claim 1, wherein another high-voltage generator having additional drive units is provided, and wherein the two high-voltage generators are permanently connected with the drive units assigned to them in fixed manner, in each instance, by way of connections free of switching elements, and wherein they cannot be connected with drive units assigned to the other high-voltage generator, in each instance.

* * * * *